Nov. 26, 1940. H. REBESKI 2,222,915
MEANS FOR ACTUATING AILERONS OF AIRCRAFT
Filed Dec. 30, 1938
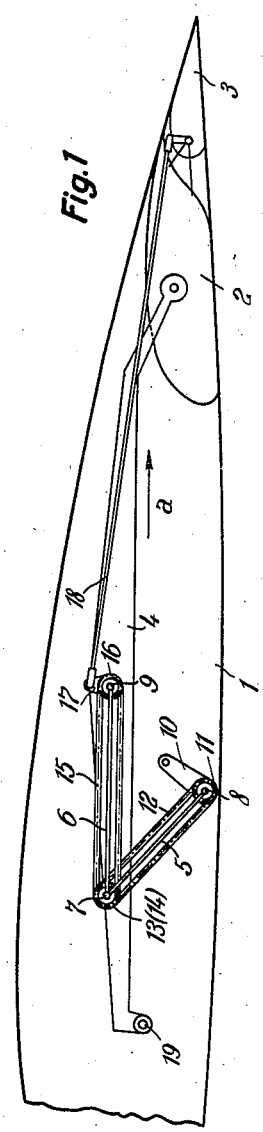
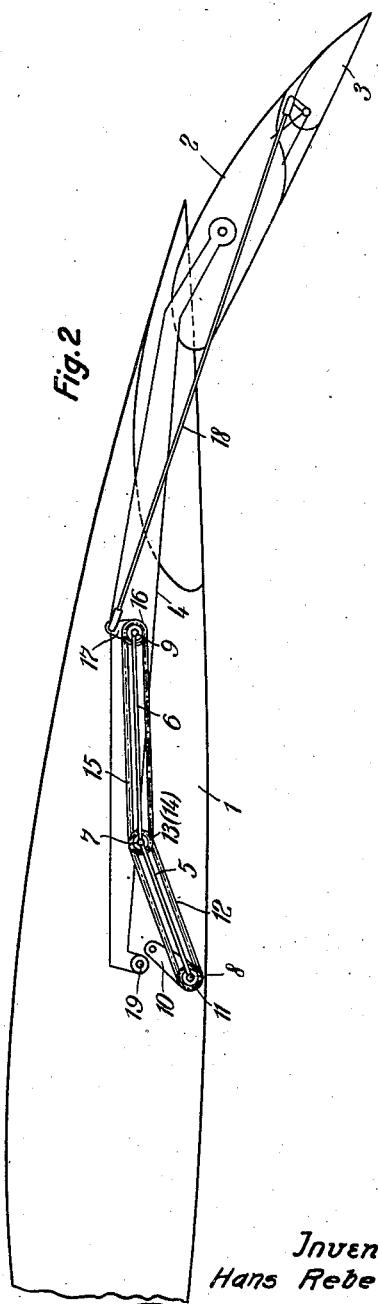
Inventor:
Hans Rebeski,
Bailey & Pearson
Attorneys Patented Nov. 26, 1940

2,222,915

UNITED STATES PATENT OFFICE 2,222,915

MEANS FOR ACTUATING AILERONS OF AIRCRAFT

Hans Rebeski, Brandenburg, Germany, assignor to Arado Flugzeugwerke Gesellschaft mit beschraenkter Haftung, Babelsberg, near Berlin, Germany, a company of Germany Application December 30, 1938, Serial No. 248,611
In Germany July 11, 1938

6 Claims. (Cl. 244—42)

The invention relates to means for actuating the ailerons of aircraft. Each aileron is adapted to be projected rearwardly from the associated main wing together with a flap or auxiliary wing.
In such constructions it is necessary that the control movements for actuation of the aileron be transmitted from a fixed structural member, in particular from the main wing, to the aileron by way of a moving structure serving for extending the flap. Both movements, i. e., the projection of the flap and the angular movement of the aileron should be capable of being effected independently of one another. Moreover, the aileron must be easily movable and there should be no play.

According to the invention the above mentioned conditions are satisfied by providing within the main wing a series of, for example, rod-like links pivotally connected with one another. Of this series of links the first is pivotally secured at its free end to the main wing and the last is secured at its free end to the outrigger serving for projecting the flap. At the junctions of the links there are mounted rotatable bodies interconnected by members extending parallel to the links and by a push rod and a lever with the aileron.

As a result, the aileron is operable by an actuating lever independently of the position of the outrigger. The actuating lever is fixedly connected with one of the rotatable bodies and is adapted to turn about a joint secured to the main wing.

In a preferred embodiment of the invention two links are provided. The rotatable bodies arranged at the ends of the links may each consist of a rotatably mounted sprocket wheel. The sprocket wheels of each pair are interconnected by an endless chain. The sprocket wheel mounted at the free end of one link is connected with the actuating lever for the aileron and the sprocket wheel mounted at the free end of the other link is connected with the aileron. The sprocket wheels provided at the junction of the two links are arranged adjacent to one another and fixedly connected with one another.

The chains are provided with chain-tightening devices which serve for adjustment of the length of the chains. For adjusting the chains the links may also be telescopically arranged so that the links can be correspondingly extended.

One embodiment of the invention is illustrated by way of example in the accompanying drawing in which Fig. 1 is a side elevation of the new arrangement with the flap and aileron in retracted position.

Fig. 2 shows the arrangement with the flap and the aileron in extended position.

Referring to the drawing, on the main wing 1 of the aircraft is mounted by means of a lever-like outrigger 4 a flap 2 which can be projected at will. On the flap 2 is pivotally mounted an aileron 3.

5 and 6 are two rod-like links which are pivotally connected with one another by a shaft 7. The end of the link 5 distant from the link 6 is mounted on a shaft 8 disposed in the main wing 1; the free end of the link 6 distant from the link 5 is pivotally mounted on a fulcrum shaft 9 on the outrigger 4.

A single-armed lever 10 which is connected with the actuating-lever (not shown) for the aileron is also pivotally mounted on the shaft 8 and is fixedly connected with a sprocket wheel 11 mounted on the same shaft. Sprocket wheel 11 transmits its movement through an endless chain 12 to a second sprocket wheel 13 rotatably mounted on the shaft 7. This sprocket wheel 13 is connected with a sprocket wheel 14 which is also mounted on the shaft 7 and which transmits its movement by means of an endless chain 15 to a sprocket wheel 16 mounted on the fulcrum shaft 9. The pairs of sprocket wheels 11 and 13 and 14 and 16 have the same diameter. Sprocket wheel 16 is also fixedly connected with a lever 17 pivoted on the fulcrum pin 9, the free end of which lever is connected by a push-rod 18 to the aileron.

The modus operandi is as follows:

The retracted position of the flap 2 and of the aileron 3 is shown in Fig. 1.

On the rocking of the lever 10 about the shaft 8 and the consequent actuation of the aileron 3 the lever 10 moves the sprocket wheel 11 therewith, and this sprocket wheel transmits its movement by means of the chain 12 to the sprocket wheel 13. Sprocket wheel 14 rotates with the sprocket wheel 13 and transmits its movement through the chain 15 to the sprocket wheel 16 and by way of the lever 17 and the push rod 18 to the aileron 3.

If the flap 2 and the aileron 3 are to be projected into the position shown in Fig. 2, the outrigger 4 is displaced in the direction of the arrow a indicated in Fig. 1, by an actuating member, not shown, connected to the point 19. The fulcrum shaft 9 fixed on the outrigger 4 moves the links 5 and 6 therewith. The common connecting shaft 7 describes an arc of a circle about the axis 8 as centre and the chains move over the sprocket wheels. The levers 10 and 17 maintain their positions relative to one another and the aileron 3 can thus be actuated independently of the position of the flap 2.

When the sprocket wheels are of the same diameter, the straight chain flights act as a parallelogram, so that the two sprocket wheels connected with one another do not perform any angular movement relatively to one another. If, however, sprocket wheels of different diameters are used, the lever 17, on moving the outrigger 4, makes an additional angular movement about the axis 9 and on extending the flap 2 turns the aileron 3 through a corresponding angle.

Without departure from the scope of the invention there may be used, instead of the sprocket wheels 14 and 16 and the chain 15, a single-armed lever which is fixedly connected with the sprocket wheel 13 and transmits its movement by means of a push rod to the lever 17.

With flaps in which the extension movement and thus the movement of the link 5 is small the above-mentioned lever fixedly connected with the sprocket wheel 13 may be connected directly by a suitably extended push rod 18 with the aileron 3, the lever 17 being omitted.

In order to be able to adjust the tension of the chains chain-tensioning devices are provided in each chain flight to permit shortening of the length of the chain. For the same purpose the links 5 and 6 may be telescopically arranged so that they can be extended and the tightening of the chains thus ensured.

I claim:

1. In an aeroplane, the combination with a main supporting wing, an aileron and a flap movable rearwardly together from said wing, and an outrigger movable to shift said flap, a series of pivotally connected links, the first of said series of links being pivotally mounted on said wing and the last of said series of links being pivotally mounted on said outrigger, rotatable bodies mounted at the pivots of said links, members extending parallel to said links and interconnecting said bodies, a lever turning with one of said bodies, and a push-rod connected to said lever, and operatively connected to said aileron.

2. In an aeroplane, the combination claimed in claim 1 including two links, conjointly rotatable sprocket wheels located at the ends of said links, endless chains connecting said sprocket wheels, an aileron-actuating lever connected to one of said sprocket wheels, another of said sprocket wheels being operatively connected with the aileron.

3. In an aeroplane, the combination claimed in claim 1 in which the rotatable bodies comprise sprocket wheels wrapped by chains, chain tensioning devices being interposed in the chains for adjusting the length of the chains.

4. In an aeroplane, the combination claimed in claim 1 in which each of the links consists of telescopically fitting parts.

5. In an aeroplane, the combination claimed in claim 1 in which the rotatable bodies are formed as rock levers, and push rods extending parallel to the links connecting said rock levers.

6. In an aeroplane, the combination claimed in claim 1 one of said levers being a rock lever, said push rod being directly connected to said rock lever at the junction of the links.

HANS REBESKI.